United States Patent
Wood et al.

(10) Patent No.: US 6,921,317 B2
(45) Date of Patent: Jul. 26, 2005

(54) AUTOMATED LAPPING SYSTEM

(75) Inventors: Jeffrey H. Wood, Eureka, MO (US); Robert E. Bender, St. Louis, MO (US); Terry A. Sewell, Ballwin, MO (US)

(73) Assignee: The Boeing Company, Chicago, IL (US)

(*) Notice: Subject to any disclaimer, the term of this patent is extended or adjusted under 35 U.S.C. 154(b) by 61 days.

(21) Appl. No.: 10/302,000

(22) Filed: Nov. 21, 2002

(65) Prior Publication Data

US 2004/0102135 A1 May 27, 2004

(51) Int. Cl.$^7$ ............................................. B24B 49/00
(52) U.S. Cl. ............................... 451/5; 451/41; 451/1; 451/8
(58) Field of Search ................................ 451/5–10, 28, 451/41, 219, 456; 414/225.01, 226.02, 226.05; 901/6, 7, 15, 14, 40, 34, 45

(56) References Cited

U.S. PATENT DOCUMENTS

| 5,129,044 A | * | 7/1992 | Kashiwagi et al. | ......... 700/251 |
| 5,497,061 A | * | 3/1996 | Nonaka et al. | ........ 318/568.11 |
| 5,814,959 A | * | 9/1998 | Nonaka et al. | ........ 318/568.11 |
| 6,379,221 B1 | * | 4/2002 | Kennedy et al. | .............. 451/41 |
| 2002/0072297 A1 | * | 6/2002 | Kennerknecht et al. | ........ 451/5 |

FOREIGN PATENT DOCUMENTS

JP          06339885 A  * 12/1994  ............ B25J/13/00

* cited by examiner

Primary Examiner—Lee D. Wilson
(74) Attorney, Agent, or Firm—Black Lowe & Graham PLLC

(57) ABSTRACT

An automated lapping system is provided for lapping a work product using a robot. Because the robot can apply continuous consistent pressure that far exceeds the capabilities of a human operator, lapping and polishing evolutions take a fraction of the time taken by a human operator. The system includes a robot having one or more lapping end effectors and a control component that controls the robot to lap the work product. The control component includes a processor, a user interface coupled to the processor, a communication component that receives final work product dimensions, and a positioning component that detects a lapping zone on the work product and sends the detected lapping zone to the control component. The control component controls the robot based on the sent lapping zone and received work product dimensions.

18 Claims, 4 Drawing Sheets

AUTOMATED LAPPING SYSTEM

RELATED APPLICATIONS

This patent application is related to concurrently-filed patent applications entitled "Contour Following End Effectors for Lapping/Polishing" and bearing Ser. No. 10/301,999 and "Spring-Loaded Contour Following End Effectors for Lapping/Polishing" and bearing Ser. No. 10/302,042, which is hereby incorporated by reference.

GOVERNMENT LICENSE RIGHTS

This invention was made with Government support under U.S. Government contract F33615-97-2-3400 awarded by United States Air Force. The Government has certain rights in this invention.

FIELD OF THE INVENTION

This invention relates generally to lapping and polishing systems and, more specifically, to automated lapping and polishing systems.

BACKGROUND OF THE INVENTION

Injection-molded aircraft canopies and windshields offer tremendous benefits to aircraft in cost, weight, and impact tolerance. A major cost in this manufacturing process is the injection mold itself. Surfaces of canopies and windshields are finished to a quality similar to an optic lens in order to prevent pilots from being subjected to visual distortion. The precise optics for canopies and windshields are built into the injection mold. The injection molds are lapped or polished by hand, section by section, using a diamond-plated lapping material. Hand polishing or lapping an injection mold takes several man-years to accomplish. Thus, lapping or polishing is very costly. Hand polishing or lapping also does not ensure that a precise, optic surface finish quality has been met.

Therefore, there exists an unmet need to reduce the cost and increase the accuracy of lapping or polishing.

SUMMARY OF THE INVENTION

The present invention provides an automated lapping system for lapping a work product using a robot. Because the robot can apply continuous, consistent pressure that far exceeds the capabilities of a human operator, lapping and polishing evolutions take a fraction of the time taken by a human.

The system includes a robot having one or more lapping end effectors and a control component for controlling the robot to lap the work product. The control component includes a processor, a user interface coupled to the processor, a communication component that receives final work product dimensions, and a positioning component that detects a lapping zone on the work product and sends the detected lapping zone to the control component. The control component controls the robot based on the sent lapping zone and received work product dimensions.

In accordance with an aspect of the invention, an alarm component detects an intruder within a threshold distance from the robot, generates a shut-off signal when an intruder is detected, and sends the shut-off signal to the robot. The robot shuts down when the shut-off signal is received.

In accordance with another aspect of the invention, a slurry dispenser that is controlled by the control component dispenses slurry onto the work product proximate to the one or more end effectors.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
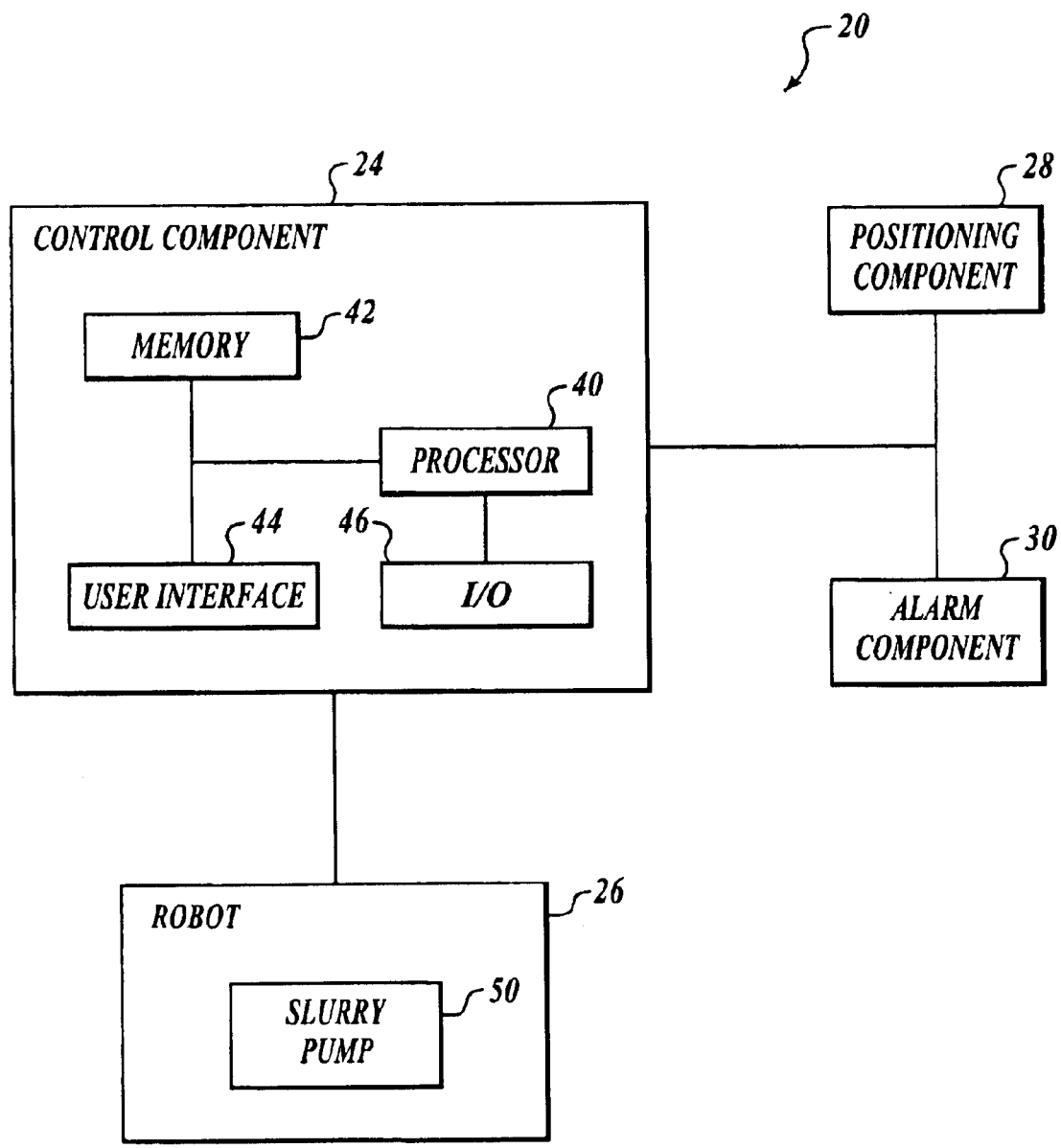
FIG. 1 illustrates a block diagram of a non-limiting example robotic lapping system formed in accordance with the present invention.

FIG. 1 illustrates a block diagram of a non-limiting example automated lapping and polishing system 20. The system 20 suitably includes a control component 24 coupled to a lapping robot 26, a positioning component 28, and an alarm component 30. The control component 24 includes a processor 40 coupled to a memory 42, a user interface 44, and an input/output device 46. The lapping robot 26 includes a component 50 for applying a slurry compound (i.e., an abrasive mixture) to a surface. A non-limiting example of the robot 26 is a Fanuc, Inc. robot. A non-limiting example of the positioning component 28 is a Dual Camera System produced by Metronor, Inc.

The processor 40 receives information of a shape of a final work product. An injection mold including a mold core and mold cavity for use in creating a polycarbonate aircraft canopy is one non-limiting example of the work product. The processor 40 receives the shape information through the input/output device 46 from an external source, such as without limitation a removable memory device or a remotely located computer coupled by a network connection. The input/output device 46 is suitably a connection to a computer modeling system that provides three-dimensional model information or optics information for the canopies that will be molded by the injection mold.

The positioning component 28 identifies the general volume of space in which the lapping or polishing is to occur. In other words, the positioning component 28 identifies the work product's location in three-dimensional space relative to the robot 26. The processor 40 generates lapping instruction information based on the information received by the input/output device 46 and the positioning component 28. The lapping instruction information read by the processor 40 is then sent to the robot 26, which then performs lapping of the work product.

Figure 2:
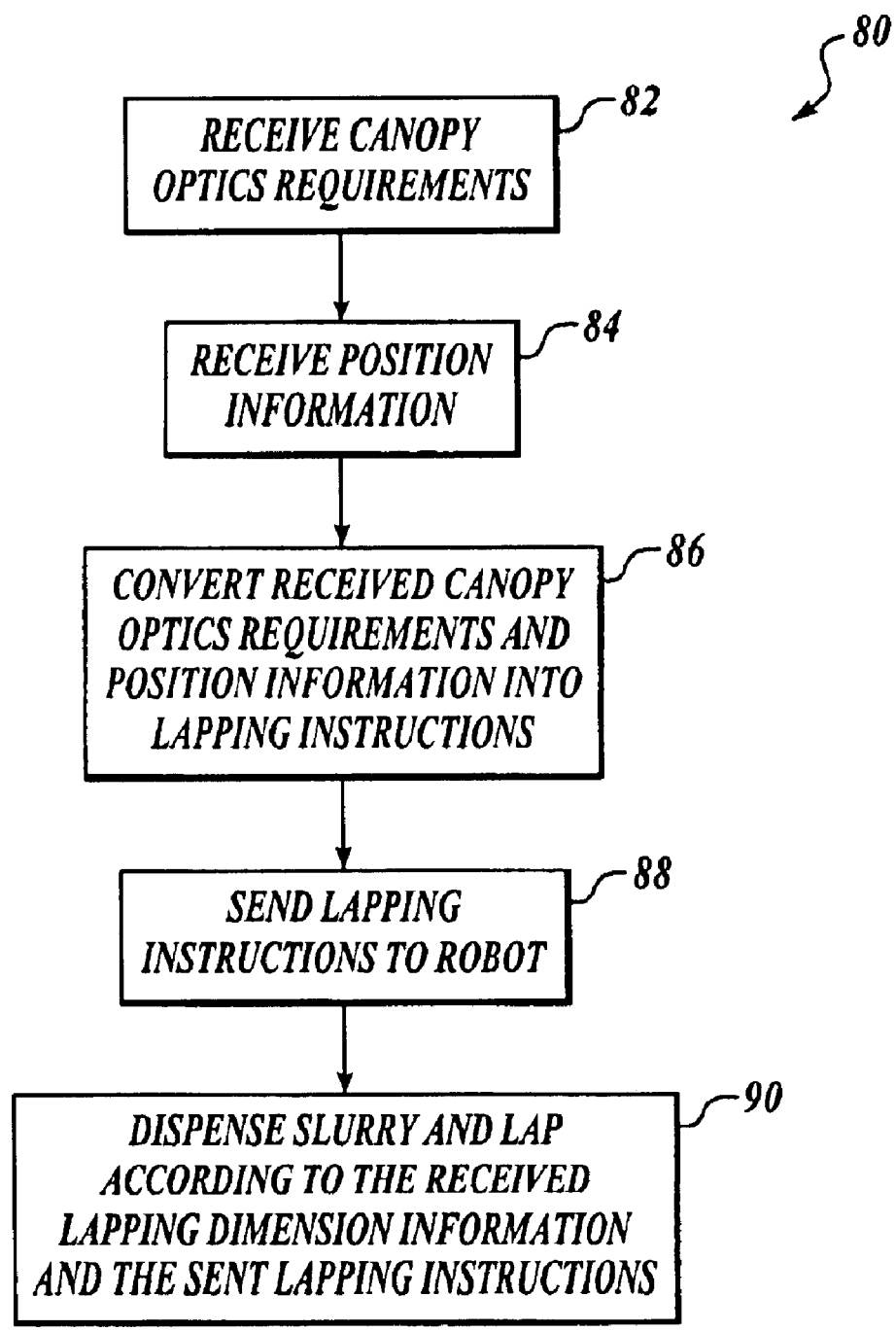
FIG. 2 illustrates a non-limiting example process performed by the system shown in FIG. 1.

FIG. 2 illustrates an exemplary process 80 suitably performed by the system 20 shown in FIG. 1. At a block 82, the processor 40 receives canopy optics requirements from an outside source through the input/output device 46. At a block 84, the control component 24 receives the position information from the positioning component 28. At a block 86, the processor 40 converts the received canopy optics requirements and the position information into lapping instructions. At a block 88, the control component 24 sends the lapping instructions to the robot 26. At a block 90, the robot 26 dispenses slurry and laps according to the received lapping dimension information and the sent lapping instructions.

The robot 26 may be stopped on occasion for replacement of lapping pad, for manual or automatic movement of the end effector to another location on the object being lapped, or for manual or automatic movement of the robot 26 to another object to be lapped in an assembly line.

Figure 3:
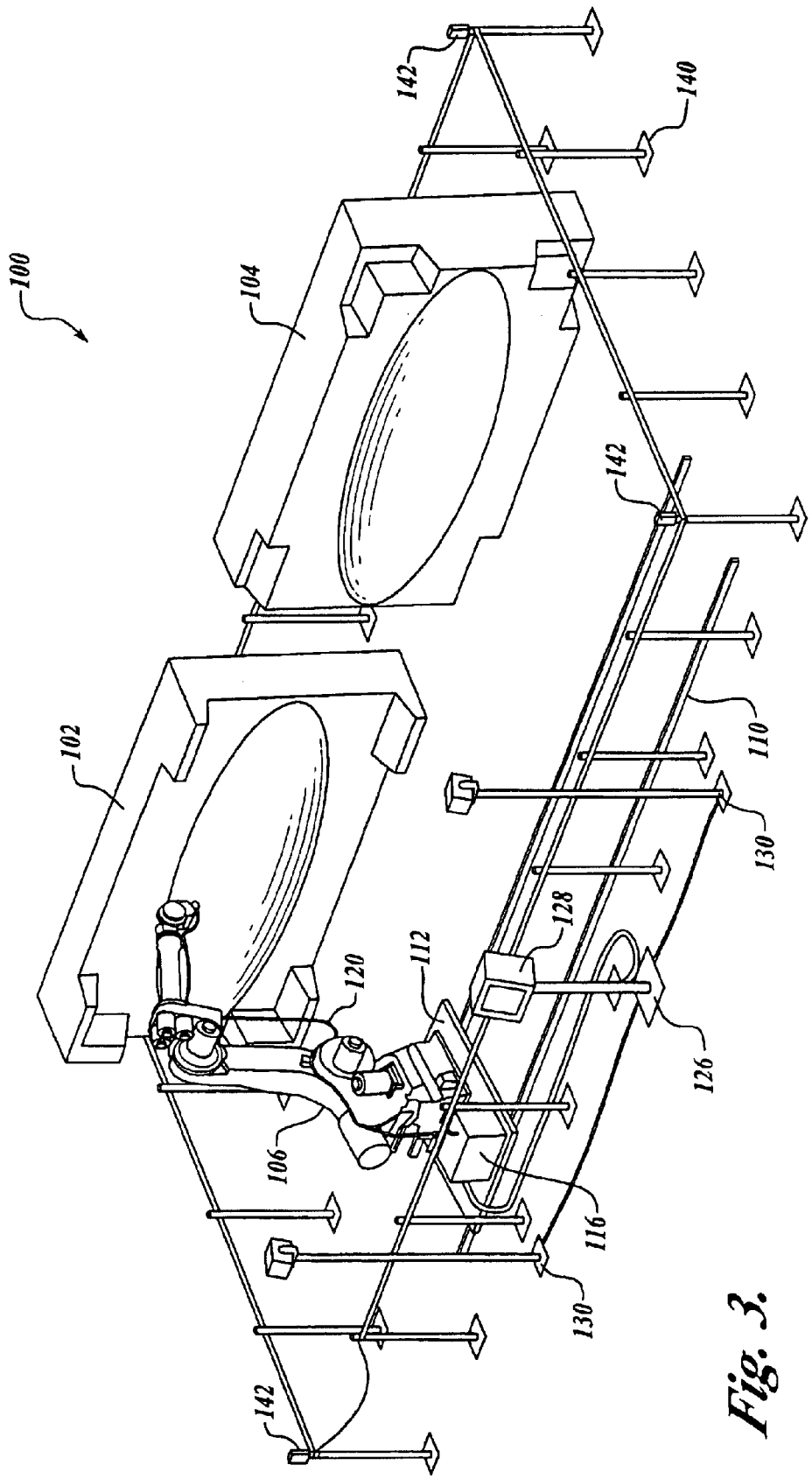
FIGS. 3 and 4 illustrate perspective views of an embodiment of the present invention.
Figure 4:
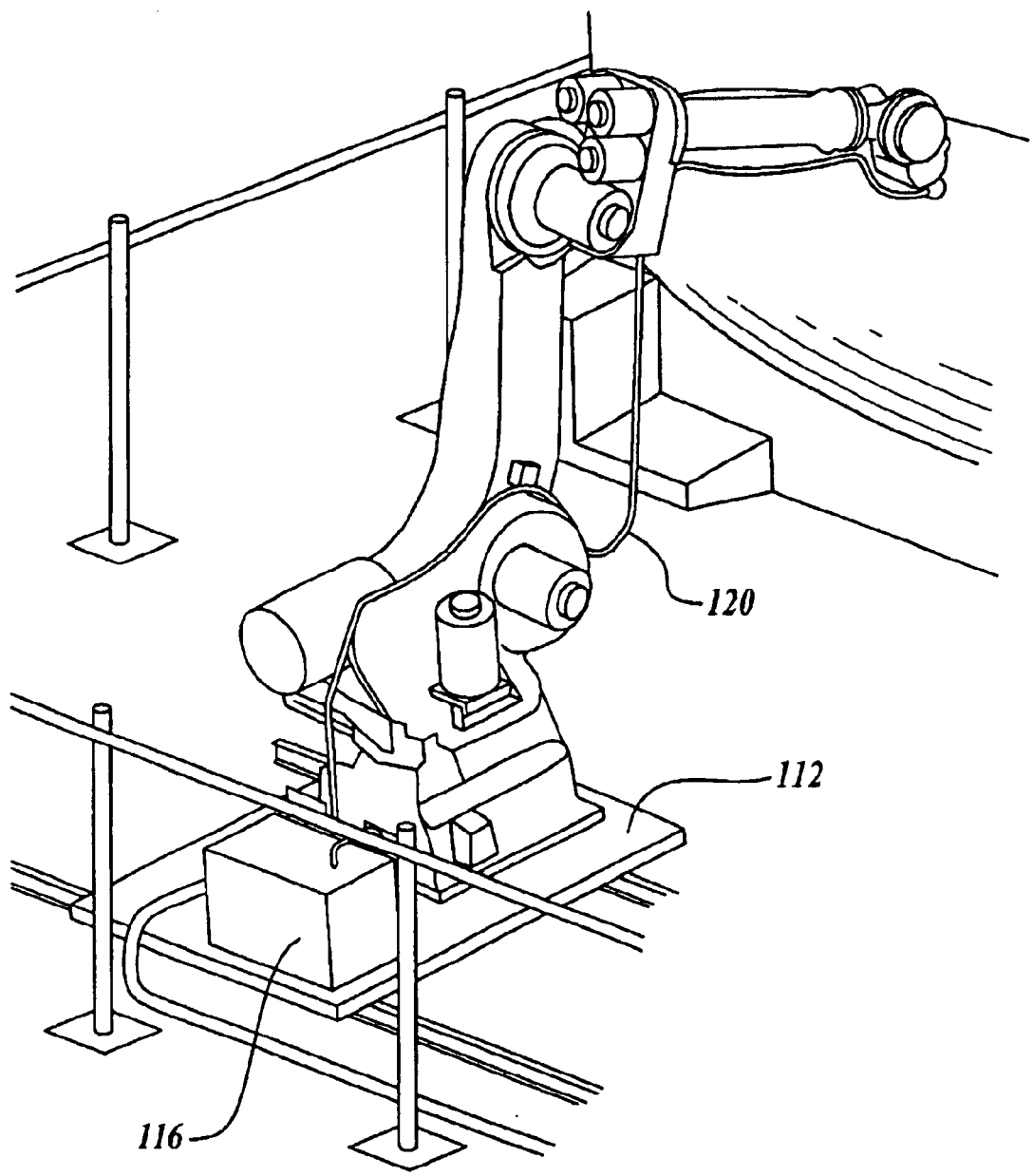

FIGS. 3 and 4 illustrate an example work cell 100 formed in accordance with the present invention. The work cell 100 includes work products, which in this example include without limitation a mold core 102 and a mold cavity 104 of an injection mold. The surfaces of the mold core 102 and the mold cavity 104 that are to be lapped or polished are directed towards a robot 106. The robot 106 is mounted onto a robot base 112 that slideably rests on a track 110. The robot base 112 suitably includes a motor (not shown) for moving the base on the track 110.

A slurry dispensing system 116 is also mounted on the robot base 112. The slurry dispensing system 116 includes a slurry pump (not shown) and a container for holding slurry and a powered mixing stirrer (not shown) to hold the abrasive in suspension. The slurry dispensing system 116 includes a slurry dispensing hose 120 that connects the slurry pump to one or more lapping end effectors (not shown). The lapping end effectors are attached to an end of an arm of the robot 106. Exemplary end effectors are described in the related co pending U.S. Patent Applications identified above and incorporated by reference.

A control station 126 is electrically coupled to a dispensing system 116 and the robot 106. The control station 126 suitably includes a touch screen display 128 that allows a user to interact with a processor therein and thus control the robot 106. The touch screen display 128 suitably presents graphical user interface components (not shown) for allowing the user to:

control the slurry dispensing system 116;
control location of the robot base 112 on the track 110; and
control robot action;
select a lapping pattern;
send the robot 106 to a safe "pause" position;
control & view the robot's speed;
control & view robot pressure on work piece; and
view graphically robot's position.

The work cell 100 also suitably includes lapping zone definition cameras 130 that sense position of a LED pen or similar device (not shown). The cameras 130 are electrically coupled to the control station 126. In order to define the boundaries on the work product a user places the LED pen or similar device on the work product at the boundary of the desired lapped area and activates the cameras 130. When the cameras 130 are activated, the cameras 130 identify the location of the pen and feed that defined zone to the control station 126, which in turn directs the robot 106 to lap that defined zone.

A safety fence 140 surrounds the work cell 100. At each corner of the safety fence 140 are sensors 142, such as without limitation thermal sensors or the like, for detecting intrusion into the work cell 100. If any of the sensors 142 detect human intrusion, a shut-off signal is sent directly to the robot 106 or to the device 126.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. An automated lapping system for lapping a work product, the system comprising:

a robot having one or more lapping end effectors and a slurry dispenser for dispensing slurry onto the work product proximate the one or more end effectors; and a control component for controlling the robot to lap the work product.

2. The system of claim 1, wherein the control component includes a processor and a user interface coupled to the processor.

3. The system of claim 2, wherein the control component further includes a communication component for receiving final work product dimensions.

4. The system of claim 3, further comprising a positioning component for detecting a lapping zone on the work product and sending the detected lapping zone to the control component.

5. The system of claim 4, wherein the control component controls the robot responsive to the sent lapping zone and received work product dimensions.

6. The system of claim 1, further comprising an alarm component for detecting an intruder within threshold distance from the robot, generating a shut-off signal when an intruder is detected, and sending the shut-off signal to the robot.

7. The system of claim 1, wherein the work product includes an injection mold for a polycarbonate canopy.

8. An automated lapping method for lapping a work product using a robot having one or more end effectors, the method comprising:

receiving final work product dimensions;

detecting a lapping zone on the work product;

sending information indicative of the detected lapping zone to the control component;

controlling the robot based on the sent lapping zone and received work product dimensions; and dispensing slurry from the robot onto the work product proximate the one or more end effectors.

9. The method of claim 8, further comprising:

detecting an intruder within threshold distance from the robot;

generating a shut-off signal if an intruder is detected; and sending the shut-off signal to the robot.

10. An automated lapping system for lapping a plurality of work products, the system comprising:

a robot having one or more lapping end effectors and a slurry dispenser for dispensing slurry onto each of the work products proximate to the one or more end effectors;

a plurality of work product stations including a work product; and a control component for controlling the robot to lap the work product.

11. The system of claim 10, wherein the control component includes a processor and a user interface coupled to the processor.

12. The system of claim 11, wherein the control component further includes a communication component for receiving final dimensions for each of the plurality of work products.

13. The system of claim 12, further comprising a plurality of positioning components for generating lapping zone information for each of the plurality of work products and sending the generated lapping zone information to the control component.

14. The system of claim 13, wherein the control component controls the robot responsive to the sent lapping zone and received work product dimensions.

15. The system of claim 10, further comprising an alarm component for detecting an intruder within the work product stations, generating a shut-off signal when a an intruder is detected, and sending the shut-off signal to at least one of the robot or the control component.

16. The system of claim 10, further comprising a motion device for moving the robot between the plurality of work product stations.

17. The system of claim 16, wherein the control component controls the motion device.

18. The system of claim 10, wherein the work products include injection molds for polycarbonate canopies.

* * * * *